United States Patent
Iyengar Gorur Krishna

(10) Patent No.: US 11,726,758 B2
(45) Date of Patent: Aug. 15, 2023

(54) EFFICIENT SCALING OF A CONTAINER-BASED APPLICATION IN A DISTRIBUTED COMPUTING SYSTEM

(71) Applicant: Microsoft Technology Licensing, LLC, Redmond, WA (US)

(72) Inventor: Ranganath Iyengar Gorur Krishna, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 485 days.

(21) Appl. No.: 16/270,136

(22) Filed: Feb. 7, 2019

(65) Prior Publication Data

US 2020/0257512 A1 Aug. 13, 2020

(51) Int. Cl.
*G06F 8/60* (2018.01)
*H04L 67/10* (2022.01)
*H04L 67/00* (2022.01)

(52) U.S. Cl.
CPC .............. *G06F 8/60* (2013.01); *H04L 67/10* (2013.01); *H04L 67/34* (2013.01)

(58) Field of Classification Search
CPC ............ G06F 8/60; H04L 67/10; H04L 67/34
See application file for complete search history.

(56) References Cited

U.S. PATENT DOCUMENTS

| | | | | |
|---|---|---|---|---|
| 9,256,467 | B1* | 2/2016 | Singh | G06F 9/5055 |
| 9,396,251 | B1* | 7/2016 | Boudreau | G06F 21/105 |
| 9,983,891 | B1* | 5/2018 | Christensen | G06F 8/63 |
| 10,326,744 | B1* | 6/2019 | Nossik | H04L 9/0822 |
| 10,382,260 | B1* | 8/2019 | Narang | G06F 18/23 |
| 10,484,301 | B1* | 11/2019 | Shukla | H04L 41/22 |
| 10,782,990 | B1* | 9/2020 | Suarez | G06F 11/301 |
| 10,812,366 | B1* | 10/2020 | Berenberg | H04L 41/0895 |
| 11,321,130 | B2* | 5/2022 | Hallur | G06F 21/53 |
| 11,494,692 | B1* | 11/2022 | Watkins | G06N 20/00 |
| 2002/0147611 | A1* | 10/2002 | Greene | G06Q 10/063112 705/1.1 |
| 2017/0034023 | A1* | 2/2017 | Nickolov | H04L 43/0817 |

(Continued)

FOREIGN PATENT DOCUMENTS

EP 3109758 A1 12/2016

OTHER PUBLICATIONS

Cheng, et al., "High Resource Utilization Auto-Scaling Algorithms for Heterogeneous Container Configurations", In Proceedings of 23rd International Conference on Parallel and Distributed Systems (ICPADS), Dec. 15, 2017, pp. 143-150.

(Continued)

*Primary Examiner* — Blake J Rubin
(74) *Attorney, Agent, or Firm* — Ray Quinney & Nebeker P.C; James Bullough

(57) ABSTRACT

A method for efficiently scaling a container-based application that provides a plurality of services includes deploying the container-based application in a distributed computing system. The plurality of services may be deployed using at least one container. The method may additionally include monitoring a utilization level associated with the at least one container. In response to detecting a trigger condition that is based at least in part on the utilization level, the method may additionally include modifying how many containers are deployed for the plurality of services.

33 Claims, 9 Drawing Sheets

(56) References Cited

U.S. PATENT DOCUMENTS

| | | | |
|---|---|---|---|
| 2017/0180346 A1* | 6/2017 | Suarez | G06F 9/45558 |
| 2017/0199770 A1* | 7/2017 | Peteva | G06F 9/5088 |
| 2017/0257424 A1* | 9/2017 | Neogi | H04L 47/781 |
| 2017/0264493 A1* | 9/2017 | Cencini | G06F 1/26 |
| 2017/0339158 A1* | 11/2017 | Lewis | H04Q 9/02 |
| 2017/0339196 A1* | 11/2017 | Lewis | H04L 63/083 |
| 2018/0136931 A1 | 5/2018 | Hendrich et al. | |
| 2018/0173502 A1* | 6/2018 | Biskup | G06F 8/30 |
| 2018/0189176 A1* | 7/2018 | Jobi | G06F 9/5022 |
| 2018/0196680 A1* | 7/2018 | Wang | G06F 9/45558 |
| 2018/0205612 A1* | 7/2018 | Rao | G06F 8/60 |
| 2018/0276020 A1* | 9/2018 | Kimura | G06F 9/45558 |
| 2018/0276021 A1* | 9/2018 | Ueda | G06F 9/45558 |
| 2018/0278639 A1* | 9/2018 | Bernstein | H04L 63/1425 |
| 2018/0285210 A1* | 10/2018 | Mitkar | G06F 8/63 |
| 2018/0288129 A1* | 10/2018 | Joshi | H04L 41/5096 |
| 2018/0316751 A1 | 11/2018 | Shen et al. | |
| 2018/0324204 A1* | 11/2018 | McClory | G06F 9/505 |
| 2018/0349168 A1* | 12/2018 | Ahmed | G06F 9/5072 |
| 2018/0357068 A1* | 12/2018 | Ambichl | G06F 9/5077 |
| 2019/0052532 A1* | 2/2019 | Chen | H04L 41/0893 |
| 2019/0065252 A1* | 2/2019 | San Miguel | G06F 9/4881 |
| 2019/0065277 A1* | 2/2019 | Raikov | H04L 67/2809 |
| 2019/0102265 A1* | 4/2019 | Ngo | H04L 67/1034 |
| 2019/0146772 A1* | 5/2019 | Griffin | G06F 11/0766 |
| | | | 717/121 |
| 2019/0205186 A1* | 7/2019 | Zhang | G06F 9/4843 |
| 2019/0220315 A1* | 7/2019 | Vallala | G06F 11/1482 |
| 2019/0312800 A1* | 10/2019 | Schibler | H04L 41/0823 |
| 2019/0332366 A1* | 10/2019 | Natanzon | G06F 11/36 |
| 2019/0354411 A1* | 11/2019 | Raikov | G06F 9/5077 |
| 2020/0089533 A1* | 3/2020 | Guha | G06F 11/3006 |
| 2020/0250006 A1* | 8/2020 | Parekh | H04L 67/1008 |
| 2021/0049049 A1* | 2/2021 | Kuik | G06F 9/45558 |
| 2021/0072966 A1* | 3/2021 | Zong | H04L 67/60 |
| 2021/0117217 A1* | 4/2021 | Croteau | G06F 11/302 |
| 2021/0157655 A1* | 5/2021 | Foreman | G06F 9/5077 |
| 2021/0182114 A1* | 6/2021 | Vyas | G06F 9/5083 |
| 2022/0129294 A1* | 4/2022 | Iwasa | G06F 9/45558 |

OTHER PUBLICATIONS

"International Search Report and Written Opinion Issued in PCT Application No. PCT/US20/015505", dated Apr. 30, 2020, 12 Pages.

* cited by examiner

EFFICIENT SCALING OF A CONTAINER-BASED APPLICATION IN A DISTRIBUTED COMPUTING SYSTEM

CROSS-REFERENCE TO RELATED APPLICATIONS

N/A

BACKGROUND

A distributed computing system is a type of computing system whose components are located on multiple computing devices. For example, a distributed computing system may include a plurality of distinct processing, memory, storage, and communication components that are connected by one or more communication networks. The various components of a distributed computing system may communicate with one another in order to coordinate their actions.

Cloud computing systems are built using principles of distributed systems. Cloud computing is the delivery of computing services (e.g., servers, storage, databases, networking, software, analytics) over the Internet.

Containerization is an approach to software development in which an application and everything that it needs, such as libraries and other dependencies, are packaged together as a standard unit that is referred to as a container image. When a container image is deployed, it is referred to as a container. The use of containers allows applications to run properly in a variety of different computing environments, regardless of any customized settings that a particular computing environment might have that could differ from the computing environment used for writing and testing the application. Containers also isolate applications from one another on a shared operating system (OS). Containers provide most of the isolation of virtual machines at a small fraction of the computing power. Containers are often used in distributed computing systems, including cloud computing systems.

The increasing popularity of containers has led to new application architectures. A microservice architecture is an architectural style that structures an application as a collection of services that are independently deployable. In this context, the term "service" refers to at least one function or operation that is performed by an application. A service may be associated with a particular network address (e.g., a uniform resource locator (URL) for Internet services). With a microservice architecture, clients may use all or only some of the services provided by an application. Also, different clients may use the same service for different purposes.

In an application that includes a plurality of independently deployable services, the services may be packaged into separate containers. An application that is architected in this way may be referred to herein as a container-based application. Container-based applications may be deployed in distributed computing systems, such as cloud computing systems. A container orchestrator is a tool that facilitates the deployment, management, scaling, networking, and availability of container-based applications in distributed computing systems.

As the load experienced by a container changes over time, system administrators may adjust the amount of resources that are allocated to the container. This is often referred to as scaling. Scaling up involves allocating additional resources (e.g., processors, memory) to a container. Scaling out involves provisioning additional containers.

SUMMARY

The present disclosure is generally related to the deployment of container-based applications in a distributed computing system. As indicated above, scaling up and scaling out are two possible approaches for adjusting the amount of resources that are allocated to a container. The present disclosure provides a new dimension of scaling by dynamically modifying how many services are included in deployed containers. For example, a single container that includes a plurality of services may be split into a plurality of containers. Alternatively, a plurality of services that are deployed in separate containers may be combined into a single container.

One aspect of the present disclosure is directed to a method for efficiently scaling a container-based application that provides a plurality of services. In accordance with the method, the container-based application may be deployed in a distributed computing system. The plurality of services may be deployed using at least one container. The method may additionally include monitoring a utilization level associated with the at least one container. In response to detecting a trigger condition that is based at least in part on the utilization level, the method may additionally include modifying how many containers are deployed for the plurality of services.

For example, detecting the trigger condition may include determining that the utilization level associated with a container that comprises a plurality of services exceeds a defined maximum value. In response to detecting this type of trigger condition, the container may be split into a plurality of containers.

As another example, if the plurality of services are implemented using a plurality of separate containers, detecting the trigger condition may include determining that the utilization level associated with the plurality of separate containers falls below a defined minimum value. In response to detecting this type of trigger condition, the plurality of services may be consolidated into a single container.

In some embodiments, the method may additionally include rearranging a plurality of containers within a plurality of nodes to improve system efficiency. For example, the plurality of containers may be rearranged to reduce how many nodes are required to deploy the plurality of containers.

DETAILED DESCRIPTION

Figure 1:
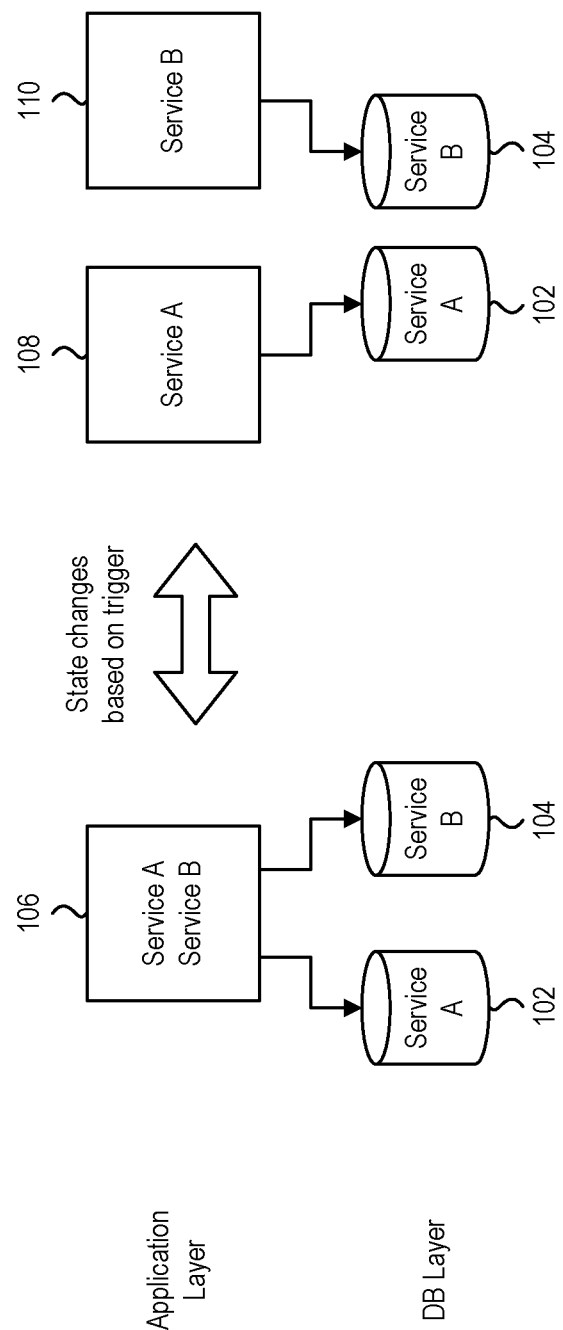
FIG. 1 illustrates an example of a scaling technique in accordance with the present disclosure.

As indicated above, the present disclosure is generally related to techniques for scaling the amount of resources that are allocated to container-based applications by dynamically modifying how many services are included in deployed containers. A simple example will be discussed in connection with FIG. 1. In this example, it will be assumed that an application includes two services, which will be referred to as service A and service B.

At the database layer, separate databases 102, 104 may be maintained for service A and service B. At the application layer, however, there are two different ways that service A and service B could be deployed. With one possible approach, both service A and service B could be packaged together in a single container 106. With another possible approach, service A could be packaged in one container 108, and service B could be packaged in another container 110. The present disclosure proposes dynamically shifting between these two possible approaches based on the utilization level of the container(s) in the current deployment. In this context, the "utilization level" associated with a container refers to the extent to which the container is consuming one or more computing resources, such as a central processing unit (CPU), memory, input/output (I/O) capacity, network bandwidth, and so forth (including combinations thereof).

Suppose that service A and service B are initially deployed in a single container 106. Further suppose that the utilization level associated with that container 106 exceeds a defined maximum value. Under these circumstances, it may be beneficial to split the container 106 into two separate containers 108, 110.

Conversely, suppose that service A and service B are initially deployed in separate containers 108, 110. Further suppose that the utilization level associated with these containers 108, 110 falls below a minimum threshold value. Under these circumstances, it may be beneficial to combine the two separate containers 108, 110 into a single container 106.

Figure 2:
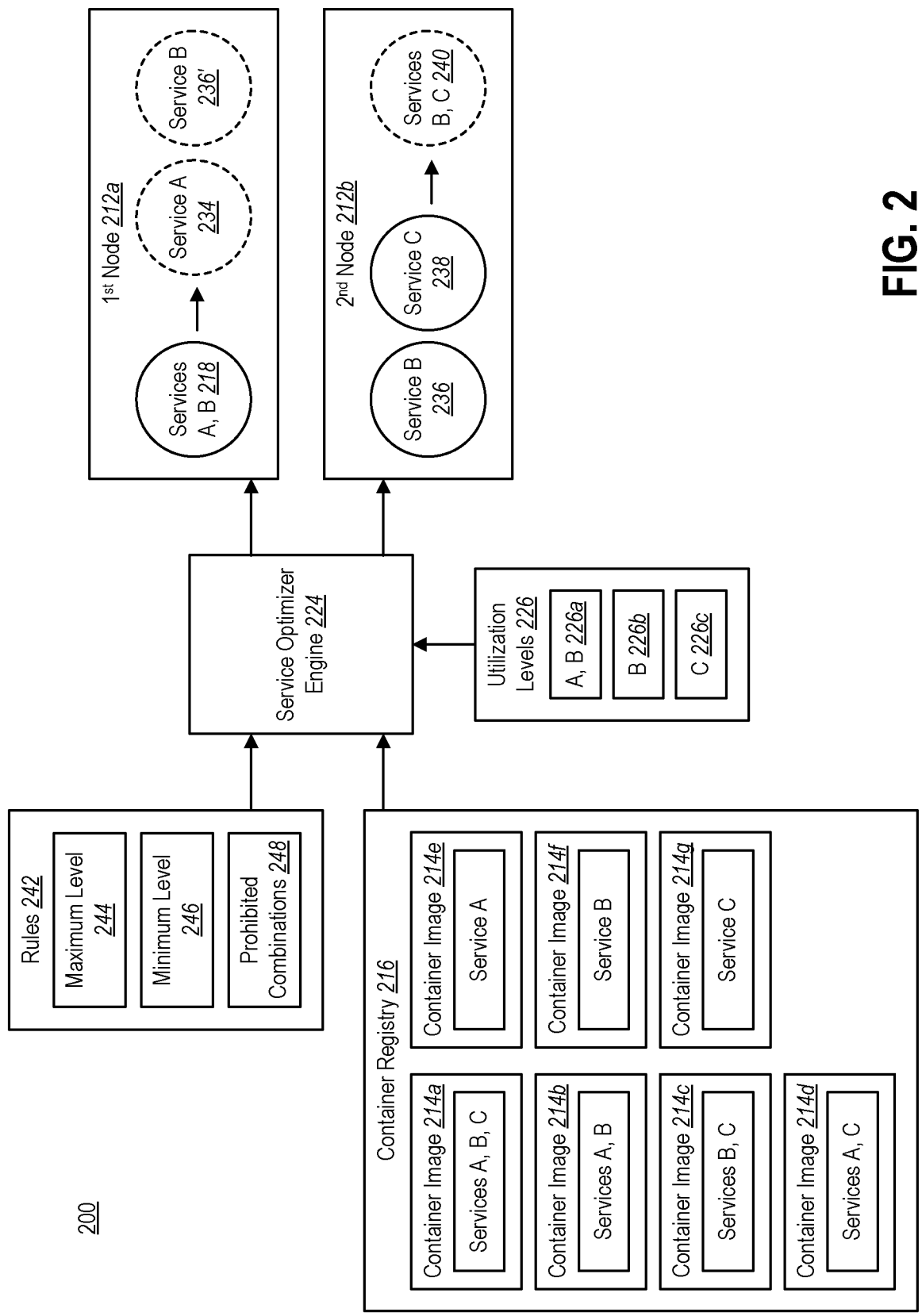
FIG. 2 illustrates an example of a system in which aspects of the present disclosure may be utilized, including a service optimizer engine that manages the deployment of a plurality of containers on a plurality of nodes.

FIG. 2 illustrates an example of a system 200 in which aspects of the present disclosure may be utilized. In this example, it will be assumed that an application that includes three services (service A, service B, and service C) is deployed in a distributed computing system that includes two nodes (a first node 212a and a second node 212b). These nodes 212a-b may represent distinct physical computing devices that are part of the distributed computing system.

In accordance with the present disclosure, a plurality of container images 214a-g may be provided. These container images 214a-g include different combinations of the services that are provided by the application. In the example shown in FIGS. 2A-B, there are seven different ways that the three services (service A, service B, and service C) may be combined. A separate container image may be created for each possible combination. More specifically, a container image 214a may be created that includes service A, service B, and service C. Another container image 214b may be created that includes service A and service B. Another container image 214c may be created that includes service B and service C. Another container image 214d may be created that includes service A and service C. Another container image 214e may be created that includes service A. Another container image 214f may be created that includes service B. Another container image 214g may be created that includes service C. The plurality of container images 214a-g may be stored in a container registry 216.

The system 200 includes a service optimizer engine 224, which is responsible for managing the deployment of containers on the nodes 212a-b. For purposes of the present example, suppose that a container 218 including service A and service B is initially deployed on the first node 212a. Further suppose that a container 236 including service B and another container 238 including service C are initially deployed on the second node 212b.

The service optimizer engine 224 monitors the utilization levels 226 associated with the containers 218, 236, 238 that have been deployed. More specifically, in the depicted example, the service optimizer engine 224 monitors the utilization level 226a associated with the container 218 that includes service A and service B, the utilization level 226b associated with the container 236 that includes service B, and the utilization level 226c associated with the container 238 that includes service C.

As indicated above, the utilization level 226 corresponding to a particular container indicates the extent to which the container is consuming one or more computing resources (e.g., CPU utilization, memory utilization, I/O capacity, network bandwidth). In some embodiments, the utilization level 226 corresponding to a particular container may be expressed in terms of a single metric that represents the extent to which the container is consuming a single computing resource (e.g., a percentage of CPU utilization). Alternatively, the utilization level 226 corresponding to a particular container may be expressed in terms of a plurality of metrics that represent the extent to which the container is consuming a plurality of computing resources (e.g., a percentage of CPU utilization and a percentage of memory utilization). Alternatively still, the utilization level 226 corresponding to a particular container may be expressed in terms of a single metric that is determined by combining a plurality of metrics that represent the extent to which the container is consuming a plurality of computing resources.

Certain rules 242 may define when modifications should be made with respect to the deployment of containers. These rules 242 may define, among other things, a maximum level 244 and a minimum level 246 for the utilization level 226 associated with a particular container.

Suppose, for example, that the utilization level 226a associated with the container 218 that includes service A and service B increases above the defined maximum level 244. In response, the service optimizer engine 224 may split the container 218 that includes service A and service B into two containers: a container 234 that includes service A and another container 236' that includes service B. To achieve this splitting, the service optimizer engine 224 may remove the container 218 that includes service A and service B from the first node 212a. In addition, the service optimizer engine 224 may access the container registry 216 to locate the container image 214e that includes service A and the container image 214f that includes service B. The service optimizer engine 224 may then deploy the container image 214e that includes service A as a container 234 that includes service A. Similarly, the service optimizer engine 224 may deploy the container image 214f that includes service B as a container 236' that includes service B. When deploying these containers 234, 236', existing techniques such as a rolling update may be used to ensure that the services that are involved (service A and service B in this example) are not disrupted.

As another example, suppose that the utilization level 226b associated with the container 236 that includes service B and the utilization level 226c associated with the container 238 that includes service C decrease below the defined minimum level 246. In response, the service optimizer engine 224 may consolidate service B and service C into a single container 240. To achieve this consolidation, the service optimizer engine 224 may remove the container 236 that includes service B and the container 238 that includes service C from the second node 212b. In addition, the service optimizer engine 224 may access the container registry 216 to locate the container image 214c that includes service B and service C. The service optimizer engine 224 may then deploy the container image 214c that includes service B and service C as a container 240 that includes service B and service C.

In addition to defining a maximum level 244 and a minimum level 246, the rules 242 may specify other constraints on the way in which services may be combined. In some embodiments, the rules 242 may specify one or more prohibited combinations 248. For example, suppose there is a rule 242 that identifies the combination of service A, service B, and service C as a prohibited combination 248. In response to that type of rule 242, the service optimizer engine 224 may eliminate from consideration the container image 214a that includes the prohibited combination of services.

In some embodiments, only container images that correspond to permitted combinations of services are created. For example, if there is a rule 242 that identifies the combination of service A, service B, and service C as a prohibited combination 248, then in some embodiments the container image 214a that includes that combination of services would not be created.

The ability to modify how many containers are deployed for particular services enables the nodes within a distributed computing system to be used more efficiently. An example will be discussed in connection with FIGS. 3A-C. In this example, it will again be assumed that an application that includes three services (service A, service B, and service C) is deployed in a distributed computing system that includes two nodes (a first node 312a and a second node 312b). For purposes of the present example, it will be assumed that both the first node 312a and the second node 312b have 6 GB of available memory. In other words, for purposes of the present example, it will be assumed that there is 6 GB of memory in both of these nodes 312a-b that can be allocated to software processes without causing performance issues.

Figure 3A:
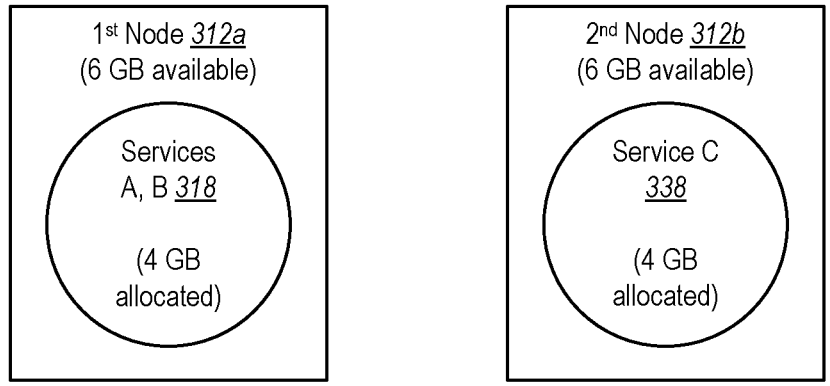
FIGS. 3A-C illustrate an example showing how the ability to modify the number of containers that are deployed for particular services enables the nodes within a distributed computing system to be used more efficiently.

Referring initially to FIG. 3A, suppose that a container 318 including service A and service B is deployed on the first node 312a, and that a container 338 including service C is initially deployed on the second node 312b. Further suppose that both of these containers 318, 338 require 4 GB of memory.

At some point, suppose that the utilization level associated with the container 318 including service A and service B exceeds a defined maximum value, such that some type of scaling should be performed in order to prevent performance degradation. As indicated above, one known approach to scaling involves scaling out, i.e., provisioning additional containers. Because the container 318 including service A and service B requires 4 GB of memory, to provision an additional instance of this container 318 would require an additional 4 GB of memory. There are, however, only 2 GB available on the first node 312a, because the container 318 including service A and service B is using 4 GB of the 6 GB that are available on the first node 312a. Similarly, there are only 2 GB available on the second node 312b, because the container 338 including service C is using 4 GB of the 6 GB that are available on the second node 312b. Therefore, in order to scale out in accordance with known techniques (i.e., by provisioning an additional instance of the container 318) it would be necessary to add an additional node to the system.

Figure 3B:
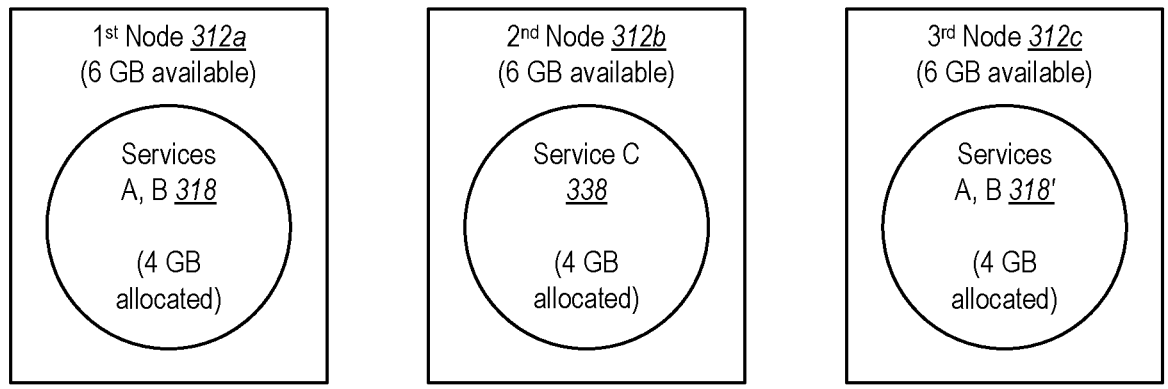

FIG. 3B shows a third node 312c added to the system. The third node 312c includes an additional container 318' including service A and service B. Scaling out in this way, however, increases the cost of the system, because an additional node 312c must be added. This kind of an approach to scaling out also results in wasted space, as 2 GB of available memory remains unused in each of the nodes 312a-c.

Figure 3C:
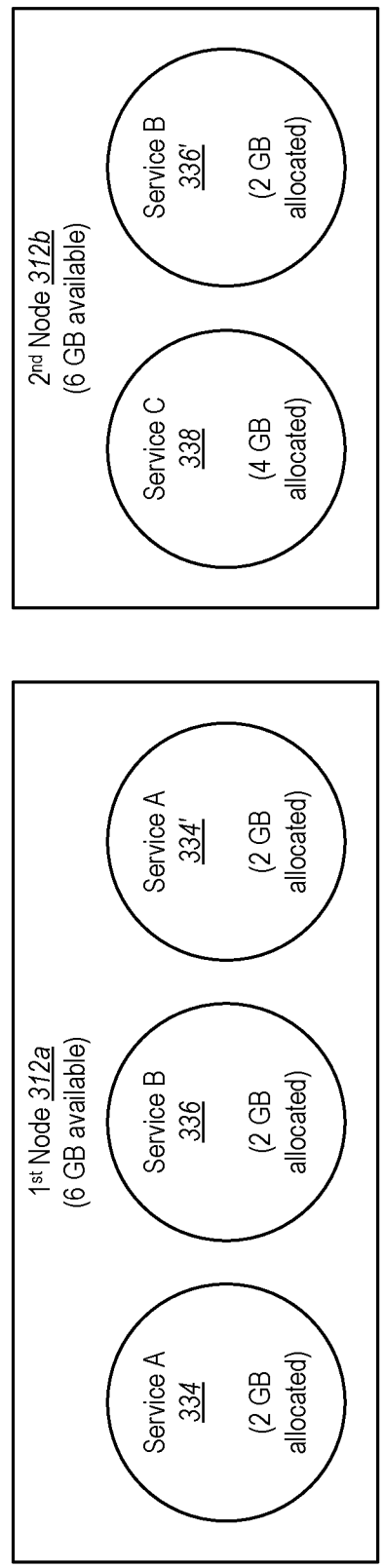

Reference is now made to FIG. 3C, which illustrates how the ability to modify the number of containers that are deployed for a set of services enables scaling out to be performed more efficiently. In this example, the container 318 including both service A and service B has been replaced with a plurality of containers, namely, a container 334 including only service A and another container 336 including only service B. It will be assumed that both of these containers 334, 336 require 2 GB of memory (which is a reasonable assumption because it was assumed that the container 318 including both service A and service B requires 4 GB of memory).

Splitting the container 318 including both service A and service B into two containers 334, 336 enables scale out to be performed more efficiently. For example, an additional container 334' including service A can be added to the first node 312a. This is possible because the container 334' only requires 2 GB of memory and the first node 312a has that much memory available. Similarly, an additional container 336' including service B can be added to the second node 312b. Again, this is possible because the container 336' only requires 2 GB of memory and the second node 312b has that much memory available.

By comparing FIGS. 3B and 3C, some potential benefits of the techniques disclosed herein can be appreciated. The configuration shown in FIG. 3B and the configuration shown in FIG. 3C both include the same number of services. In particular, both configurations include two instances of service A, two instances of service B, and one instance of service C. The configuration shown in FIG. 3B, however, requires three nodes 312a-c and has a total of 6 GB of unused memory. In contrast, the configuration shown in FIG. 3C requires only two physical servers 312a-b and has no unused memory. In essence, splitting a container that includes a plurality of services into a plurality of containers (as in the configuration shown in FIG. 3C) increases the granularity at which scale out can be performed, thereby making it possible to make more efficient use of system resources.

The example shown in FIGS. 3A-C also illustrates another aspect of the present disclosure, which is the ability to split and rearrange a plurality of containers within a plurality of nodes to increase system efficiency. For example, suppose that a container-based application is initially deployed in a distributed computing system in the manner shown in FIG. 3B, with three nodes 312a-c. A service optimizer engine that is managing this system may determine that the containers 318, 318' should be split and rearranged to achieve the configuration shown in FIG. 3C, which only requires two nodes 312a-b. Splitting and rearranging the containers 318, 318' in this way would increase system efficiency by, for example, reducing the number of nodes that are required to deploy the container-based application.

In some embodiments, the service optimizer engine may make the decision to split and rearrange the containers 318, 318' irrespective of the utilization levels of the containers 318, 318'. In other words, even if the utilization levels of the containers 318, 318' are within permitted levels, the service optimizer engine may nonetheless decide to split and rearrange the containers 318, 318' to achieve the increased efficiency that is made possible by the configuration shown in FIG. 3C.

Figure 4:
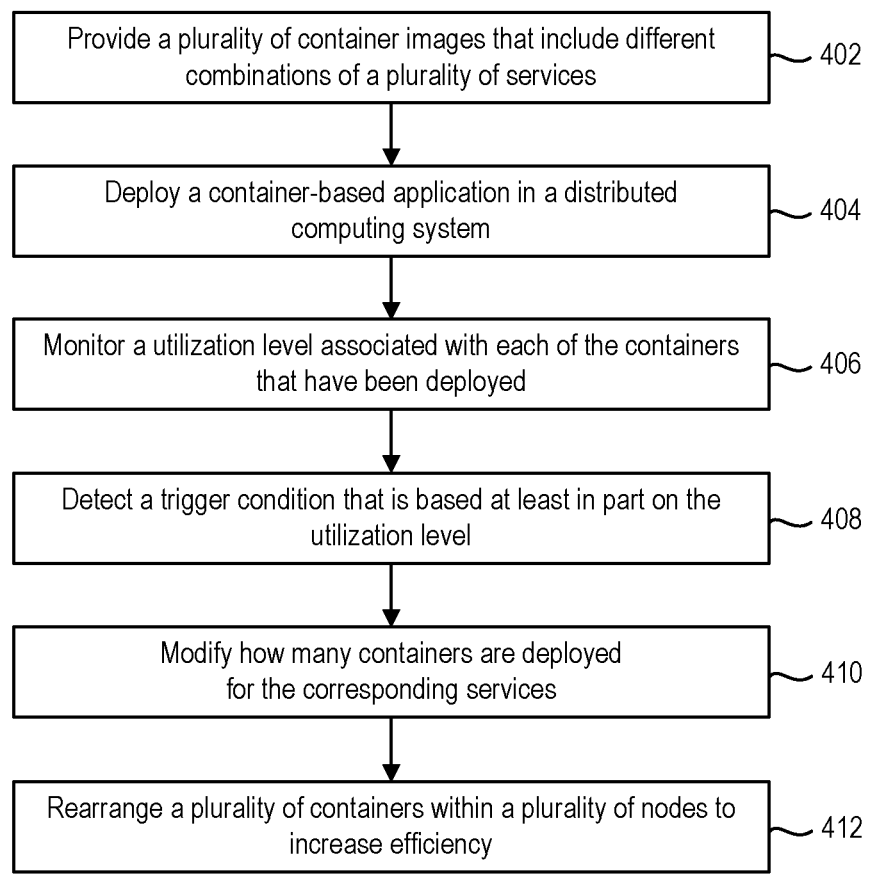
FIG. 4 illustrates an example of a method for efficiently scaling a container-based application in accordance with the present disclosure.

FIG. 4 illustrates an example of a method 400 for efficiently scaling a container-based application in accordance with the present disclosure. For the sake of clarity, the method 400 will be described in relation to the examples that were discussed above in connection with FIGS. 2 and 3A-C.

Step 402 of the method 400 involves providing a plurality of container images that include different combinations of a plurality of services provided by a container-based application. For instance, referring to the example shown in FIG. 2, seven different container images 214a-g may be provided for a container-based application that provides three services. Those seven different container images 214a-g correspond to all possible combinations of those three services. In an alternative embodiment, container images may be provided for all possible combinations of the available services except for any combinations that are prohibited by defined rules 242.

In step 404 of the method 400, the container-based application is deployed in a distributed computing system that includes a plurality of nodes. The container-based application provides a plurality of services, and the plurality of services are deployed using at least one container. For instance, referring to the example shown in FIG. 2, the container-based application is initially deployed using three containers: a container 218 that includes service A and service B, a container 236 that includes service B, and a container 238 that includes service C. The container 218 that includes service A and service B is deployed on a first node 212a. The container 236 that includes service B and the container 238 that includes service C are deployed on a second node 212b.

Step 406 involves monitoring a utilization level associated with each of the containers that have been deployed. In other words, for each container, a determination may be made about the extent to which that container is consuming one or more computing resources (e.g., CPU, memory, I/O capacity, network bandwidth).

Step 408 involves detecting a trigger condition that is based at least in part on the utilization level. Once a trigger condition has been detected, step 410 involves modifying how many containers are deployed for the corresponding services in response to detecting the trigger condition. In this context, the term "trigger condition" refers to an event or set of events that causes a modification to be made to the way in which containers are deployed in relation to a plurality of services. There may be a set of rules 242 that define one or more trigger conditions.

One example of a trigger condition is when the utilization level associated with a particular container that includes a plurality of services exceeds a defined maximum value. In response to detecting this type of trigger condition, the container whose utilization level exceeds the defined maximum value could be split into a plurality of containers. For instance, referring to the example shown in FIGS. 2A-C, if the utilization level 226a of the container 218 that includes service A and service B exceeds a defined maximum level 244, then that container 218 could be split into a container 234 that includes service A and a container 236' that includes service B.

Another example of a trigger condition is when the utilization level associated with a plurality of separate containers falls below a defined minimum value. In response to detecting this type of trigger condition, the services in the containers whose utilization levels have fallen below the defined minimum value could be consolidated into a single container. For instance, referring to the example shown in FIGS. 2A-C, if the utilization level 226b of the container 236 that includes service B and the utilization level 226c of the container 238 that includes service C fall below a defined minimum level 246, then service B and service C could be consolidated into a single container 240.

Step 412 involves rearranging a plurality of containers within a plurality of nodes to increase efficiency by, for example, reducing how many nodes are required to deploy the plurality of containers. For example, suppose that a container-based application is initially deployed in a distributed computing system in the manner shown in FIG. 3B, which requires three nodes 312a-c. In accordance with steps 410 and 412 of the method 400, a determination may be made that the containers 318, 318' should be split and rearranged to achieve the configuration shown in FIG. 3C, which requires only two nodes 312a-b. In some embodiments, this determination may be made irrespective of the utilization levels of the containers 318, 318'.

Figure 5:
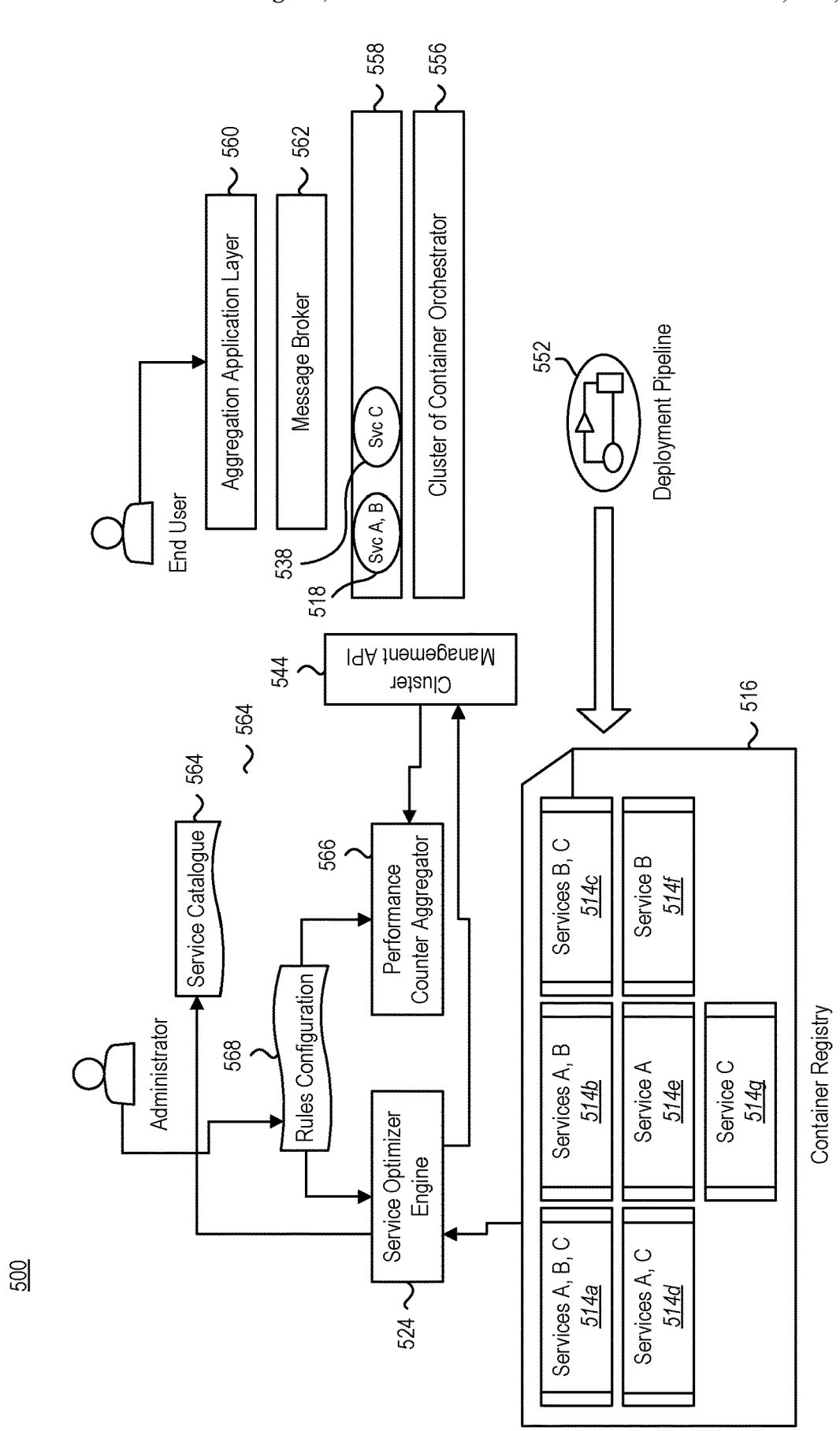
FIG. 5 illustrates another example of a system in which aspects of the present disclosure may be utilized, including a performance counter aggregator and a service optimizer engine that interact with a dynamic service layer via one or more cluster management application programming interfaces (APIs).

FIG. 5 illustrates another example of a system 500 in which aspects of the present disclosure may be utilized. As before, it will be assumed that a container-based application that includes three services (service A, service B, and service C) is deployed in a distributed computing system that includes a plurality of nodes. A plurality of container images 514a-g may be provided, corresponding to different combinations of the services that are provided by the application.

The system 500 includes a deployment pipeline 552, which is an automated set of processes that use tools to compile, test, and deploy code. The plurality of container images 514a-g may be generated by the deployment pipeline 552. For example, the deployment pipeline 552 may utilize one or more scripts to generate the plurality of container images 514a-g.

A system administrator (or other user of the system 500) may want to deploy at least some of the container images 514a-g as actual containers. For example, as shown in FIG. 5, the container image 514b that includes service A and service B may be deployed as a container 518 that includes service A and service B, and the container image 514g that includes service C may be deployed as a container 538 that includes service C. To facilitate deployment of these containers 518, 538, a service optimizer engine 524 may make one or more application programming interface (API) calls to a cluster management API 554. In addition, a container orchestrator 556 may be used to manage the deployment of the containers 518, 538. The containers 518, 538 may be deployed into a dynamic service layer 558.

Broadly speaking, the application architecture framework that is represented in the system 500 shown in FIG. 5 includes two layers. First, there is the dynamic service layer 558, which includes the deployed containers 518, 538. Second, there is an aggregation application layer 560, which communicates with the dynamic service layer 558 through a message broker 562. The aggregation application layer 560 interfaces with end users and provides an API/presentation layer for the container-based application. The API/presentation layer may be converted to the appropriate back end service calls to be made to particular services through the message broker 562.

The services may be exposed through a service catalog 564. The database systems corresponding to the various services may be implemented outside of the application layer (as shown in FIG. 1, for example) in order to facilitate a microservices architecture.

Once certain containers (e.g., the container 518 corresponding to the container image 514b that includes service A and service B, and the container 538 corresponding to the container image 514g that includes service C) have been deployed, the system 500 may monitor the load that is being experienced by the containers 518, 538. For example, the system 500 may monitor the computing resources (e.g., CPU, memory, network bandwidth, I/O capacity) that are being utilized by the containers 518, 538. The system 500 is shown with a performance counter aggregator 566 for providing this functionality.

The system 500 includes a rules configuration 568 that defines when the number of containers that are being utilized for the deployed services should be modified. The services that are being provided in the depicted example (service A, service B, and service C) are included in two containers 518, 538. In particular, service A and service B are included in one container 518, and service C is included in another container 538. The rules configuration 568 defines the conditions that cause the number of containers in use to be changed. In other words, the rules configuration 568 defines when a different number of containers (other than two) should be utilized for these three services.

The rules configuration 568 may include rules that are similar to those that were discussed above in connection with the rules 242 shown in the system 200 of FIG. 2. For example, as discussed above, the rules configuration 568 may include a rule specifying that when the utilization level associated with a container that includes a plurality of services exceeds a defined maximum value, the plurality of services should be split into a plurality of containers. Alternatively, the rules configuration 568 may include a rule specifying that when the utilization level associated with a plurality of containers falls below a defined minimum value, the services that are included in the plurality of containers should be consolidated into a single container.

Figure 6:
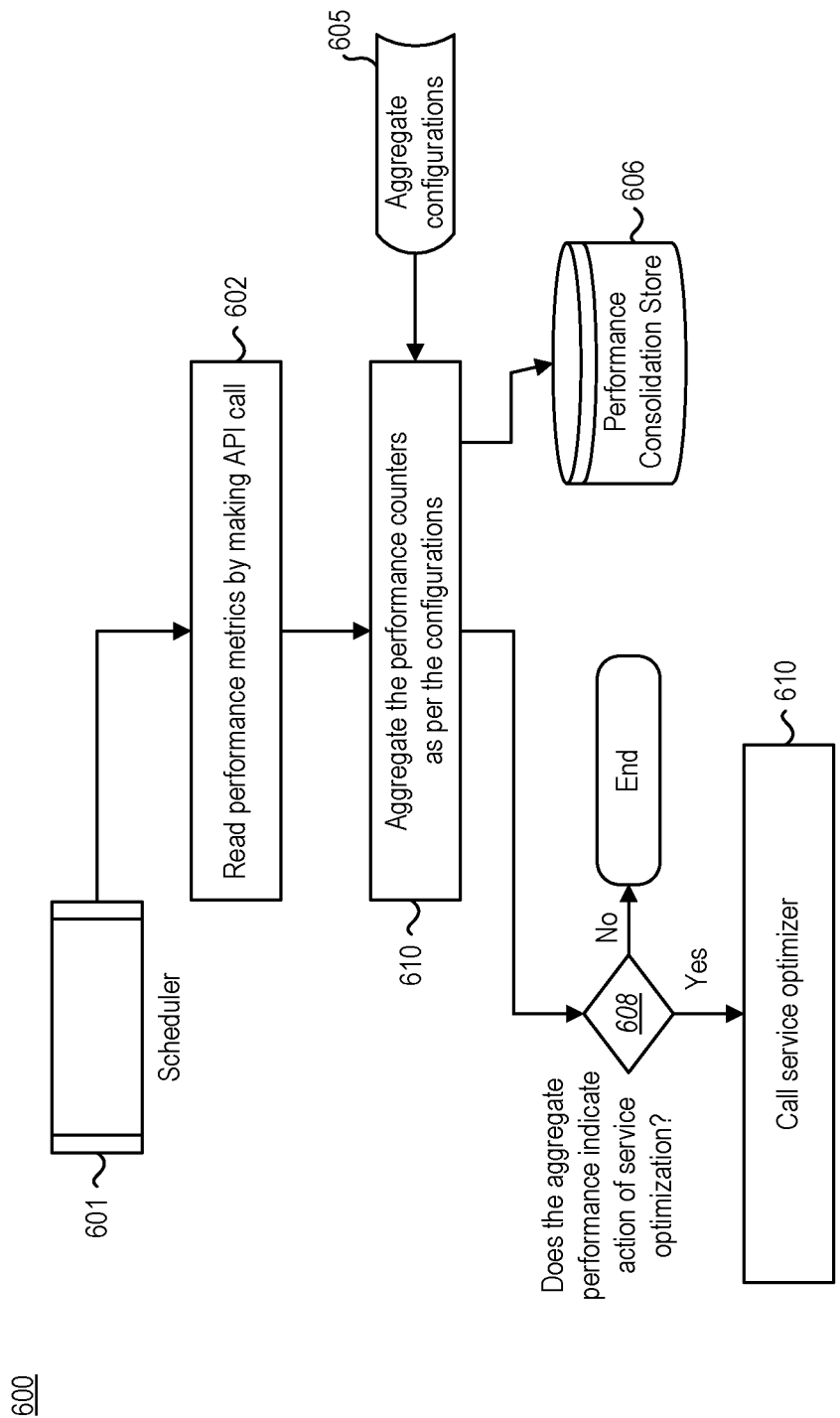
FIG. 6 illustrates an example of a method that may be performed by the performance counter aggregator in the system shown in FIG. 5.

FIG. 6 illustrates a method 600 that may be performed by the performance counter aggregator 566 in the system 500 shown in FIG. 5. In step 602 of the method 600, the performance counter aggregator 566 reads performance metrics related to currently deployed containers, such as the containers 518, 538 in the system 500 shown in FIG. 5. These performance metrics may indicate the utilization level that is associated with the currently deployed containers. To read these performance metrics, the performance counter aggregator 566 may make one or more API calls to the cluster management API 554. The performance counter aggregator 566 gets triggered from a scheduler 601, determines how often the performance metrics should be collected. The scheduler 601 may be configurable (e.g., by a system administrator). Configurations (which are shown as aggregate configurations 605 in FIG. 6) may be defined to control how often the performance metrics are read (e.g., which API calls are made).

In step 604, the performance counter aggregator 566 aggregates the performance counters in accordance with the rules that are specified in the rules configuration 568. The aggregate configurations 605 are shown as providing input to this step 604. The results of step 604 (e.g., the aggregated performance counters) may be saved in a data store 606, which is labeled in FIG. 6 as a performance consolidation store 606.

In step 608, the performance counter aggregator 566 determines whether the aggregated performance counters indicate that service optimization should be performed. As part of making this determination, the performance counter aggregator 566 may refer to rules that are specified in the rules configuration 568. If a determination is made that service optimization should be performed, then in step 610 the performance counter aggregator 566 calls the service optimizer engine 524.

Figure 7:
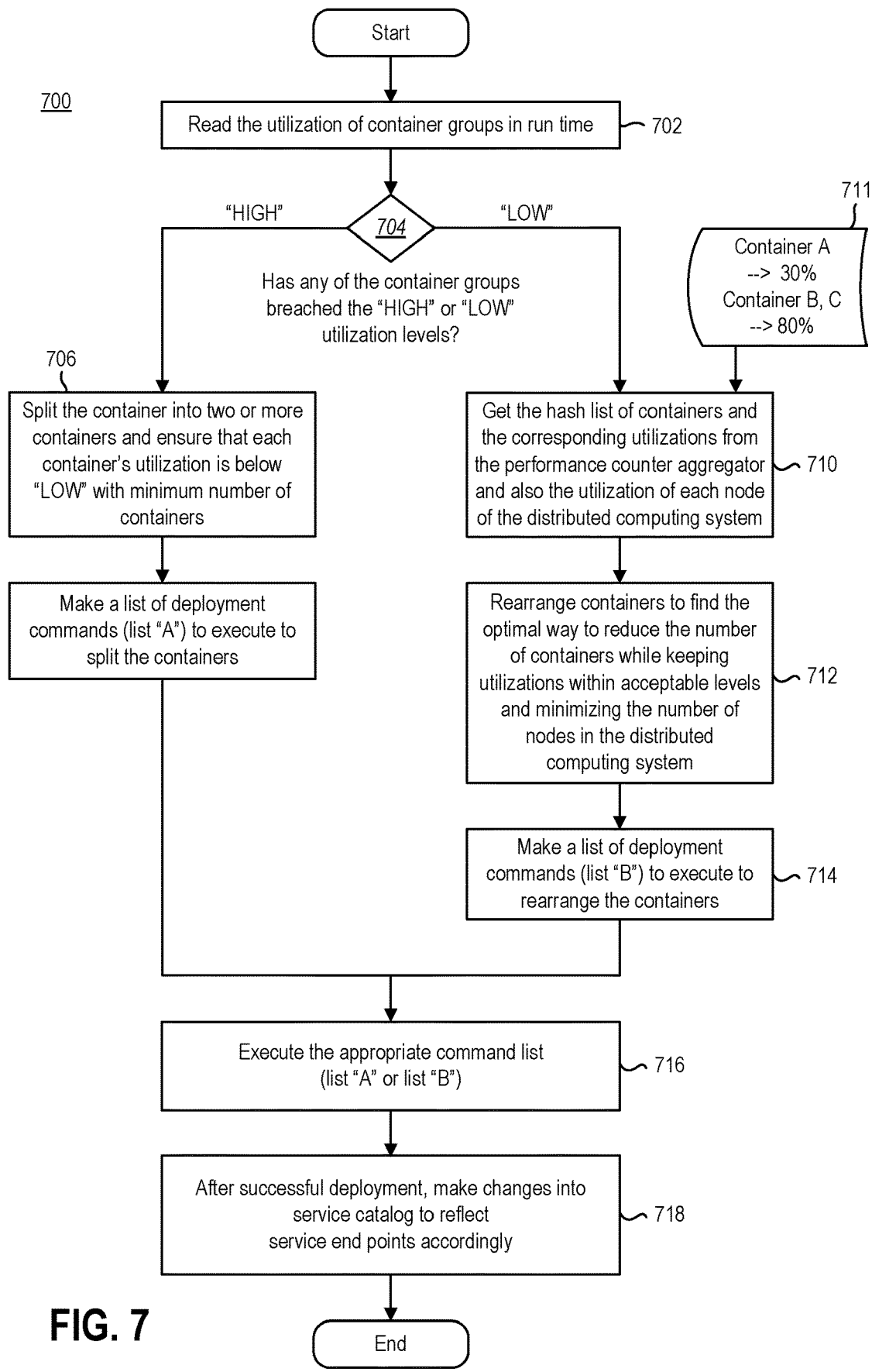
FIG. 7 illustrates an example of a method that may be performed by the service optimizer engine in the system shown in FIG. 5.

FIG. 7 illustrates a method 700 that may be performed by the service optimizer engine 524 in the system 500 shown in FIG. 5. In step 702 of the method 700, the service optimizer engine 524 reads the utilization of containers in run time. As discussed above, a container may include a single service. Alternatively, a plurality of services may be packaged together in a single container. In other words, a container may include a group of services.

In the method 700 shown in FIG. 7, it will be assumed that there are (at least) two pre-defined utilization levels: "HIGH" and "LOW." These utilization levels may be configured by a system administrator. The "HIGH" utilization level refers to a maximum desired utilization level. If the utilization level of a particular container exceeds the "HIGH" utilization level, then the container should be split. Conversely, the "LOW" utilization level refers to a minimum desired utilization level. If the utilization level of a plurality of containers falls below the "LOW" utilization level, then those containers should be combined. The "HIGH" utilization level corresponds to the maximum level 244 described above, while the "LOW" utilization level corresponds to the minimum level 246 described above.

Step 704 involves making a determination about whether any of the deployed containers has exceeded the "HIGH" utilization level or fallen below the "LOW" utilization level. If the utilization level of any of the deployed containers has exceeded the "HIGH" utilization level, then the method 700 proceeds to step 706. Conversely, if the utilization level of any of the deployed containers has fallen below the "LOW" utilization level, then the method 700 proceeds to step 710.

For each container whose utilization level has exceeded the "HIGH" utilization level, step 706 involves splitting that container into N containers, where N is greater than or equal to two. In some embodiments, the splitting may be performed so as to satisfy (at least) two conditions. First, each container's utilization level should be below the "LOW" utilization level. Second, the minimum number of containers that is required to satisfy the first condition should be used. In other words, the minimum value of N may be selected for which all N containers have utilization levels that are below the "LOW" utilization level.

The utilization levels for particular containers may be based on information contained in one or more databases (such as the databases 102, 104 shown in FIG. 1). Such information may be used to understand the utilization patterns of various services and make decisions accordingly. The decision making process could also implement machine learning models as well to predict the right way to group or arrange the services into different containers.

One reason for performing the splitting in such a way that all N containers have utilization levels that are below the "LOW" utilization level is to ensure that these containers will eventually be merged into other containers, thereby resulting in a more efficient resource allocation. One potential problem with this approach is that there could be a "ping-pong" effect, where containers are repeatedly split and merged. However, such a problem could be addressed by defining rules that have the effect of discontinuing the splitting and merging operations when a "ping-pong" effect is detected.

In alternative embodiments, instead of splitting a container so that each of the resulting containers have a utilization level that is below the "LOW" utilization level, the splitting may be performed in other ways. For example, the splitting could be performed to achieve average utilization across containers, or to achieve the lowest utilization among all the containers.

In step 708, the service optimizer engine 524 makes a list of deployment commands to execute to split the container(s). This list will be referred to as list "A" to distinguish it from another list that will be discussed below.

If in step 704 it is determined that the utilization level of one or more of the deployed containers has fallen below the "LOW" utilization level, then in step 710 the service optimizer engine 524 obtains a list 711 (e.g., a hash list) of the containers and the corresponding utilizations from the performance counter aggregator 566. This list 711 is shown as an input to step 710 in FIG. 7. The service optimizer engine 524 also determines the utilization of each node of the distributed computing system (e.g., cluster).

Step 712 involves rearranging containers to find the optimal way to reduce the number of containers while keeping utilizations within acceptable levels (e.g., below "HIGH" and above "LOW") and also minimizing the number of nodes in the distributed computing system that are being used to deploy the application. In step 714, the service optimizer engine 524 makes a list of deployment commands (list "B") that should be executed to rearrange the containers.

In step 716, the service optimizer engine 524 executes the appropriate list of commands (list "A" or list "B"). After successful deployment, step 718 involves making changes to the service catalog 564 to reflect service end points accordingly.

Figure 8:
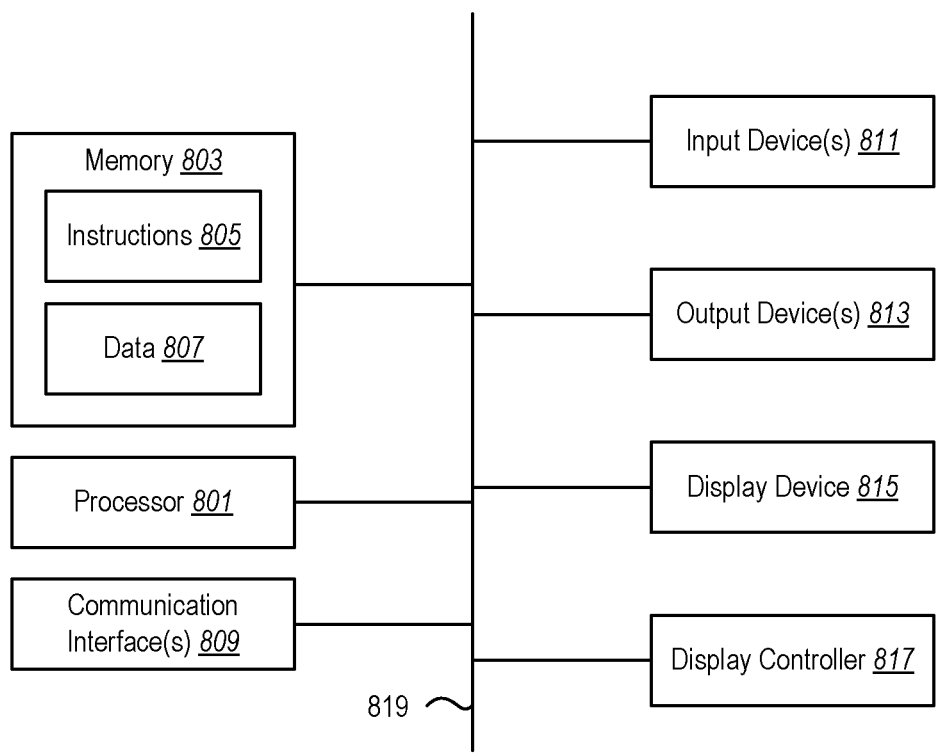
FIG. 8 illustrates certain components that may be included within a computer system that may be used to implement the various devices, components, and systems described herein.

FIG. 8 illustrates certain components that may be included within a computer system 800. One or more computer systems 800 may be used to implement the various devices, components, and systems described herein.

The computer system 800 includes a processor 801. The processor 801 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 801 may be referred to as a central processing unit (CPU). Although just a single processor 801 is shown in the computer system 800 of FIG. 8, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 805 and data 807 may be stored in the memory 803. The instructions 805 may be executable by the processor 801 to implement some or all of the steps, operations, actions, or other functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

A computer system 800 may also include one or more communication interfaces 809 for communicating with other electronic devices. The communication interface(s) 809 may be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 800 may also include one or more input devices 811 and one or more output devices 813. Some examples of input devices 811 include a keyboard, mouse, microphone, remote control device, button, joystick, trackball, touchpad, and lightpen. Some examples of output devices 813 include a speaker and a printer. One specific type of output device that is typically included in a computer system 800 is a display device 815. Display devices 815 used with embodiments disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 8 as a bus system 819.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory computer-readable medium having computer-executable instructions stored thereon that, when executed by at least one processor, perform some or all of the steps, operations, actions, or other functionality disclosed herein. The instructions may be organized into routines, programs, objects, components, data structures, etc., which may perform particular tasks and/or implement particular data types, and which may be combined or distributed as desired in various embodiments.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for efficiently scaling a container-based application, comprising:
   deploying the container-based application in a distributed computing system, wherein the container-based application provides a plurality of services, and wherein the plurality of services are implemented using a plurality of separate containers;
   monitoring a utilization level associated with the plurality of separate containers;
   detecting a trigger condition that is based at least in part on the utilization level, wherein detecting the trigger condition comprises determining that the utilization level associated with the plurality of separate containers falls below a defined minimum value;
   modifying how many containers are deployed for the plurality of services in response to detecting the trigger condition, wherein modifying how many containers are deployed comprises consolidating the plurality of services into a single container; and
   deploying at least one different combination of the plurality of services provided by the container-based application implemented using the single container.

2. The method of claim 1, further comprising providing rules that define when modifications should be made with respect to deployment of containers.

3. The method of claim 2, wherein the rules define:
   a maximum value for the utilization level; and
   the defined minimum value.

4. The method of claim 1, further comprising providing a plurality of container images that comprise different combinations of the plurality of services provided by the container-based application.

5. The method of claim 4, wherein the plurality of container images comprise:
   all possible combinations of the plurality of services; or
   all possible combinations of the plurality of services except for any combinations that are prohibited by defined rules.

6. A system for efficiently scaling a container-based application, comprising:
   one or more processors; and
   memory comprising instructions that are executable by the one or more processors to:
      deploy the container-based application in a distributed computing system, wherein the container-based application provides a plurality of services, and wherein the plurality of services are implemented using a plurality of separate containers;
      monitor a utilization level associated with the plurality of separate containers;
      detect a trigger condition that is based at least in part on the utilization level, wherein detecting the trigger condition comprises determining that the utilization level associated with the plurality of separate containers falls below a defined minimum value;
      modify how many containers are deployed for the plurality of services in response to detecting the trigger condition, wherein modifying how many containers are deployed comprises consolidating the plurality of services into a single container; and
      deploy at least one different combination of the plurality of services provided by the container-based application being implemented using the single container.

7. The system of claim 6, wherein the instructions are additionally executable by the one or more processors to provide rules that define when modifications should be made with respect to deployment of containers.

8. The system of claim 7, wherein the rules define:
   a maximum value for the utilization level; and
   the defined minimum value.

9. The system of claim 6, wherein the instructions are additionally executable by the one or more processors to provide a plurality of container images that comprise different combinations of the plurality of services provided by the container-based application.

10. A method for efficiently scaling a container-based application, comprising:
    deploying the container-based application in a distributed computing system, wherein the container-based application provides a plurality of services, and wherein the plurality of services are deployed using at least one container;
    monitoring a utilization level associated with the at least one container;
    detecting a trigger condition that is based at least in part on the utilization level;
    modifying how many containers are deployed for the plurality of services in response to detecting the trigger condition, wherein modifying how many containers are deployed comprises splitting the at least one container into a plurality of containers;

rearranging the plurality of containers within a plurality of nodes to reduce how many nodes are required to deploy the plurality of containers; and deploying at least one different combination of the plurality of services provided by the container-based application among the plurality of containers.

11. The method of claim 10, wherein detecting the trigger condition comprises determining that the utilization level associated with a container that comprises a plurality of services exceeds a defined maximum value.

12. The method of claim 10, further comprising providing rules that define when modifications should be made with respect to deployment of containers.

13. The method of claim 12,
wherein the rules define a maximum value for the utilization level and a minimum value for the utilization level, or
wherein the rules prohibit at least one combinations of services from being packaged in the same container.

14. The method of claim 10, further comprising providing a plurality of container images that comprise different combinations of the plurality of services provided by the container-based application.

15. The method of claim 14, wherein the plurality of container images comprise:
all possible combinations of the plurality of services; or
all possible combinations of the plurality of services except for any combinations that are prohibited by defined rules.

16. A system for efficiently scaling a container-based application, comprising:
one or more processors; and
memory comprising instructions that are executable by the one or more processors to:
deploy the container-based application in a distributed computing system, wherein the container-based application provides a plurality of services, and wherein the plurality of services are deployed using at least one container;
monitor a utilization level associated with the at least one container;
detect a trigger condition that is based at least in part on the utilization level;
modify how many containers are deployed for the plurality of services in response to detecting the trigger conditions, wherein modifying how many containers are deployed comprises splitting the at least one container into a plurality of containers;
rearrange the plurality of containers within a plurality of nodes to reduce how many nodes are required to deploy the plurality of containers; and
deploy at least one different combination of the plurality of services provided by the container-based application among the plurality of containers.

17. The system of claim 16, wherein detecting the trigger condition comprises determining that the utilization level associated with a container that comprises a plurality of services exceeds a defined maximum value.

18. The system of claim 16, wherein the instructions are additionally executable by the one or more processors to provide rules that define when modifications should be made with respect to deployment of containers.

19. The system of claim 18,
wherein the rules define a maximum value for the utilization level and a minimum value for the utilization level, or wherein the rules prohibit at least one combinations of services from being packaged in the same container.

20. The system of claim 16, wherein the instructions are additionally executable by the one or more processors to provide a plurality of container images that comprise different combinations of the plurality of services provided by the container-based application.

21. A method for efficiently scaling a container-based application, comprising:
deploying the container-based application in a distributed computing system, wherein the container-based application provides a plurality of services, and wherein the plurality of services are deployed using at least one container;
providing a plurality of container images that comprise different combinations of the plurality of services provided by the container-based application;
monitoring a utilization level associated with the at least one container;
detecting a trigger condition that is based at least in part on the utilization level;
modifying how many containers are deployed for the plurality of services in response to detecting the trigger condition; and
deploying at least one different combination of the plurality of services provided by the container-based application among the modified containers.

22. The method of claim 21, wherein:
detecting the trigger condition comprises determining that the utilization level associated with the at least one container that comprises a plurality of services exceeds a defined maximum value; and
modifying how many containers are deployed comprises splitting at least one container into a plurality of containers.

23. The method of claim 21, wherein:
the plurality of services are implemented using a plurality of separate containers;
detecting the trigger condition comprises determining that the utilization level associated with the plurality of separate containers falls below a defined minimum value; and
modifying how many containers are deployed comprises consolidating the plurality of services into a single container.

24. The method of claim 21, wherein:
modifying how many containers are deployed comprises splitting the at least one container into a plurality of containers; and
the method further comprises rearranging the plurality of containers within a plurality of nodes to reduce how many nodes are required to deploy the plurality of containers.

25. The method of claim 21, further comprising providing rules that define when modifications should be made with respect to deployment of containers.

26. The method of claim 25,
wherein the rules define a maximum value for the utilization level and a minimum value for the utilization level, or
wherein the rules prohibit at least one combination of services from being packaged in the same container.

27. The method of claim 21, wherein the plurality of container images comprise:

all possible combinations of the plurality of services; or all possible combinations of the plurality of services except for any combinations that are prohibited by defined rules.

28. A system for efficiently scaling a container-based application, comprising:

one or more processors; and memory comprising instructions that are executable by the one or more processors to:

deploy the container-based application in a distributed computing system, wherein the container-based application provides a plurality of services, and wherein the plurality of services are deployed using at least one container;

provide a plurality of container images that comprise different combinations of the plurality of services provided by the container-based application;

monitor a utilization level associated with the at least one container;

detect a trigger condition that is based at least in part on the utilization level;

modify how many containers are deployed for the plurality of services in response to detecting the trigger condition; and deploy at least one different combination of the plurality of services provided by the container-based application among the modified containers.

29. The method of claim 28, wherein:

detecting the trigger condition comprises determining that the utilization level associated with the at least one container that comprises a plurality of services exceeds a defined maximum value; and modifying how many containers are deployed comprises splitting the at least one container into a plurality of containers.

30. The method of claim 28, wherein:

the plurality of services are implemented using a plurality of separate containers;

detecting the trigger condition comprises determining that the utilization level associated with the plurality of separate containers falls below a defined minimum value; and modifying how many containers are deployed comprises consolidating the plurality of services into a single container.

31. The method of claim 28, wherein:

modifying how many containers are deployed comprises splitting the at least one container into a plurality of containers; and the method further comprises rearranging the plurality of containers within a plurality of nodes to reduce how many nodes are required to deploy the plurality of containers.

32. The method of claim 28, wherein the instructions are additionally executable by the one or more processors to provide rules that define when modifications should be made with respect to deployment of containers.

33. The method of claim 32, wherein the rules define:

a maximum value for the utilization level; and a minimum value for the utilization level.

* * * * *